United States Patent
Su et al.

(10) Patent No.: US 9,296,865 B1
(45) Date of Patent: Mar. 29, 2016

(54) CROSSLINKABLE POLYSILOXANE MOLECULE

(71) Applicant: NATIONAL CHUNG SHAN INSTITUTE OF SCIENCE AND TECHNOLOGY, Longtan Township (TW)

(72) Inventors: Wen-Chiung Su, Taipei (TW); Ying-Ling Liu, Zhongli (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/546,076

(22) Filed: Nov. 18, 2014

(51) Int. Cl.
*C08G 77/388* (2006.01)
*C08G 77/14* (2006.01)
*C08G 77/26* (2006.01)

(52) U.S. Cl.
CPC ............... *C08G 77/26* (2013.01); *C08G 77/14* (2013.01); *C08G 77/388* (2013.01)

(58) Field of Classification Search
None
See application file for complete search history.

(56) References Cited

U.S. PATENT DOCUMENTS 8,143,363 B2 * 3/2012 Taden ................ C08G 77/452
528/10

OTHER PUBLICATIONS

"Preparation of Polysiloxane Oligomers Bearing Benzoxazine Side Groups and Tunable Properties of their Thermosets" authored by Zhu et al. and published in the Journal of Applied Polymer Science (2014) 131(21) 40960/1-40960/8.*
pdf of web page showing the dates of public availability for the article entitled "Preparation of Polysiloxane Oligomers Bearing Benzoxazine Side Groups and Tunable Properties of their Thermosets" authored by Zhu et al. and published in the Journal of Applied Polymer Science (2014) 131(21) 40960/1-40960/8.*

* cited by examiner

*Primary Examiner* — Marc Zimmer
(74) *Attorney, Agent, or Firm* — Schmeiser, Olsen & Watts, LLP

(57) ABSTRACT

A crosslinkable polysiloxane molecule is in the form of a polysiloxane polymeric chain with a pendant group, that is, a benzoxazine group, and thus is capable of undergoing a crosslinking reaction spontaneously to produce a crosslinkable polysiloxane polymeric material. The benzoxazine group enhances the compatibility between a polysiloxane polymer and a conventional organic polymeric material, functions as a polymer flame retardant or reaction-oriented additive, and widens the application of a polysiloxane polymer to organic polymeric materials in property adjustment and the applicability of the organic polymeric materials.

4 Claims, No Drawings

CROSSLINKABLE POLYSILOXANE MOLECULE

FIELD OF TECHNOLOGY

The present invention relates to polymers with crosslinkable characteristics, and more particularly, to a polysiloxane molecule with a benzoxazine reaction group for enhancing the compatibility between polysiloxane and the other polymers.

BACKGROUND

According to the prior art, a polysiloxane is produced by hydrolyzing a chlorosilane. The long chain of a polysiloxane molecule is composed of silicon atoms which alternate with oxygen atoms and is surrounded by organic molecular groups to thereby acquire organic properties and inorganic properties. The most important characteristics of polysiloxanes include their tolerance to high heat, low temperature, adverse circumstances, ozone, and solvents, electrical insulation, hydrophobicity, and permeability. With their glass-rubber transition temperatures (Tg) being extremely low, polysiloxanes exhibit special mechanical properties and electrical performance within a wide range of temperatures; hence, polysiloxanes have wide application in commerce and defense. Since silicones are incompatible with most organic polymers, silicones are widely used as release agents for plastics, rubber, glass, and metals and used as a defoamer, a lubricant, and a polisher.

A modifying process of a polymeric material typically involves introducing a small amount of rubber into a plastic by means of doping or copolymerization. In this regard, polysiloxanes also serve as a modifier for phenolic resin, acrylic resin, and epoxy resin, though the resultant modification is seldom smooth, not only because polysiloxanes are incompatible with the other polymers, but also because the resultant polymerization manifests a wide variety of results.

According to the prior art, a polysiloxane polymer undergoes a cross-linking reaction in the presence of a curing agent to produce a three-dimensional crosslinkable polymer. For instance, an unsaturated bond and a Si—H bond of a polysiloxane react to undergo a polyaddition reaction and thus get cross-linked. Furthermore, a polysiloxane polymer undergoes a cross-linking reaction in the presence of a cross-linking agent which produces free radicals; however, the cross-linking reaction based on two reagents proves disadvantageous in terms of application and properties adjustment. Hence, it is imperative to develop a polysiloxane molecule which not only manifests cross-linking reaction characteristics but also has novelty and non-obviousness.

In this regard, a benzoxazine group effectuates self-polymerization by undergoing a ring opening polyaddition reaction. Hence, if a benzoxazine group reacts with the chain of a polymer, the polymer will become capable of undergoing cross-linking spontaneously. In addition, even when heated up, the benzoxazine does not produce any volatile by-product and thus can undergo curing to thereby exhibit heat tolerance, non-flammability, excellent electrical characteristics, and applicability in electronic-oriented materials, such as laminated boards, adhesives, and packaging agents. Therefore, plenty of molecules for use in integrating a benzoxazine and a siloxane structure are synthesized, and these molecules are mostly polysiloxane molecules each with their two ends carrying a benzoxazine group. The characteristics of the chain of the polysiloxane molecule are conducive to improvement of the properties of benzoxazine polymers. Moreover, it is feasible to synthesize a polymeric chain composed of repetitive units of polysiloxane, and its backbone chain carries a benzoxazine group to overcome an otherwise existing drawback—the polymers become brittle upon completion of a cross-linking reaction. The prior art usually entails using a polysiloxane to improve the benzoxazine group polymers which function conventionally as thermosetting resins rather than developing a polysiloxane which has novel structures and properties and is capable of undergoing a cross-linking reaction.

SUMMARY

In view of the aforesaid drawbacks of the prior art, it is an objective of the present invention to provide a crosslinkable polysiloxane molecule which has a backbone chain composed of the polysiloxane molecule such that a benzoxazine group is connected to the polysiloxane molecule by a chemical bond to become a pendant group of the polysiloxane molecule to thereby form a polysiloxane molecule which has a pendant group carrying a benzoxazine group, wherein the benzoxazine group enhances the compatibility between the polysiloxane polymer and a conventional organic polymeric material, and the benzoxazine group is capable of undergoing self-polymerization through a ring opening polyaddition reaction to thereby form a polymeric chain capable of undergoing cross-linking spontaneously.

Regarding the crosslinkable polysiloxane molecule of the present invention, its molecular structure is expressed by the following chemical formula.

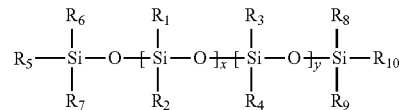

wherein $500 \geq x+y \geq 2$, substitute groups $R_1$ through $R_4$ are each a benzoxazine group-containing substitute group or an aliphatic group or aromatic group which contains one to 12 carbon atoms. At least one of the substitute groups $R_1$ through $R_4$ is a benzoxazine group-containing substitute group. The substitute groups $R_5$ through $R_{10}$ are each an aliphatic group or aromatic group which contains one to 12 carbon atoms.

The present invention is advantageously characterized in that: by adjusting the length of chains of silicon-oxygen bonds, the functionality of a pendant group, and the cross-linking of a polymeric chain, it is practicable to synthetic a lot of materials from siloxane. The synthetic materials each have unique chemical functions and properties. By controlling the types of organic groups bonded to a silicon atom, it is feasible to produce compounds which demonstrate high variability, such that siloxane manifests important organic functions, including compatibility and substantivity. Siloxane is incompatible with organic polymers; however, when bonded to a large organic group, siloxane has its functions changed in a manner to approximate to that of organic polymers. Furthermore, since inreactive siloxane lacks substantivity, if an reactive organic group is bonded to a siloxane, the siloxane will become reactive and thus can form stable bonds with the other organic polymers.

It is an objective of the present invention to provide a crosslinkable polysiloxane molecule characterized in that: the polysiloxane polymeric chain has a pendant group carrying a benzoxazine group and is capable of undergoing a cross-linking reaction spontaneously to obtain a cross-linked polysiloxane polymeric material; the benzoxazine group enhances the compatibility between a polysiloxane polymer and a conventional organic polymeric material and widens the application of a polysiloxane polymer to organic polymeric material in adjusting properties and the feasibility thereof. Since the benzoxazine group is not only capable of undergoing a polyaddition reaction spontaneously but is also conducive to an advantage, that is, reactive products produced in its ring opening reaction are also reactive toward the other chemical groups, such as a phenolic group, an amino group, and a thiol group. Hence, according to the present invention, a polysiloxane polymer of a pendant group carrying a benzoxazine group can also function as a reaction-oriented reagent to be added to the other compounds or materials to form therewith a chemical bond, so as to produce a crosslinkable polymeric material.

Another objective of the present invention is that the crosslinkable polysiloxane molecule is provided in the form of a polysiloxane polymeric chain of a pendant group carrying a benzoxazine group, wherein the benzoxazine group undergoes a ring opening polyaddition reaction to attain a cross-linking structure, such that the cross-linking structure is conducive to high-coke production characteristics during pyrolysis, wherein high-coke production characteristics are effective in increasing the amount of a flammable substance released from a polymeric material during pyrolysis to a gaseous phase to function as a fuel, such that it plays an important role in a solid-phase flame retardation mechanism for organic polymeric materials. On the other hand, it is verified that, if silicon dioxide is effectively produced from organic silicon during pyrolysis, then the silicon dioxide will move to the surface of the material because it has low surface energy. Also, since silicon dioxide demonstrates high thermal stability, it is unlikely to undergo pyrolysis at a typical flame temperature, and thus silicon dioxide is suitable for use as a protective layer of an organic material to prevent the organic material from undergoing pyrolysis continuously, thereby enhancing the non-flammability of the organic material. The aforesaid function, coupled with the aforesaid high-coke production characteristics, brings about a synergistic effect on the non-flammability effect.

The above mechanism for producing a silicon dioxide structure during pyrolysis is applicable to phenyl-containing polysiloxane. Low-valence and frequently-used polydimethyl siloxane undergoes pyrolysis to produce a split product, that is, a cyclic trimer or a cyclic tetramer of siloxane carrying two methyl groups. The split product escapes in a gaseous phase directly, and thus a split product derived from silicon dioxide is unlikely to produce. Hence, during a pyrolysis test, silicon dioxide cannot be produced from polydimethyl siloxane polymers to enhance non-flammability or even attain non-flammability. As a result, although polydimethyl siloxane polymers are a cheap, convenient, and accessible source of organic silicon, they are not effective in improving the combustion characteristics of organic polymeric materials.

The present invention provides a polysiloxane polymer of a pendant group carrying a benzoxazine group to undergo a ring opening cross-linking reaction to produce a ring-opening cross-linking structure of the benzoxazine structure which then forms a chemical bond with a backbone chain structure of polydimethyl siloxane. Given the structure, the pyrolysis process is characterized in that: the molecule chain of polydimethyl siloxane gets cross-linked to the benzoxazine cross-linking structure produced in the ring opening reaction to thereby effectively change the polydimethyl siloxane and thus produce a split product of a cyclic trimer or a cyclic tetramer, wherein the split product escapes in a gaseous phase directly. Therefore, a polysiloxane polymer of a pendant group carrying a benzoxazine group undergoes a ring opening cross-linking reaction to produce a cross-linking structure, wherein the molecule chain of the polydimethyl siloxane undergoes pyrolysis to thereby display high-coke production characteristics, such that the silicon-oxygen structure is kept by the coke thus produced, thereby turning into a similar silicon dioxide substance which exhibits high tolerance to heat and enhancing non-flammability.

The present invention provides a polysiloxane polymer carrying a benzoxazine reaction group to undergo a cross-linking reaction spontaneously on its own or in the presence of another material to attain a crosslinkable polymeric material. The benzoxazine group of the polysiloxane polymer carrying a benzoxazine reaction group enhances the coke production yield during the pyrolysis process of the polysiloxane polymer and thus functions as a flame retardant or reaction-oriented additive for enhancing the flame retardation effect of polymeric materials.

DETAILED DESCRIPTION

To enable persons skilled in the art to fully understand the objectives, features, and advantages of the present invention, the present invention is hereunder illustrated with specific embodiments.

The present invention provides a crosslinkable polysiloxane molecule. The polysiloxane molecule has a pendant group, that is, a benzoxazine group. To enable persons skilled in the art to gain insight into the polysiloxane molecule of the present invention, the structures, components, and production methods of the polysiloxane molecule are described in detail below. Obviously, the implementation of the present invention is not restrictive of conventional special details of crosslinkable polymers, benzoxazine molecule and its polymers, and polysiloxane. On the other hand, well-known structures and components are omitted from the description below in order to avoid placing any unnecessary restrictions on the polysiloxane molecule of the present invention.

Embodiment 1

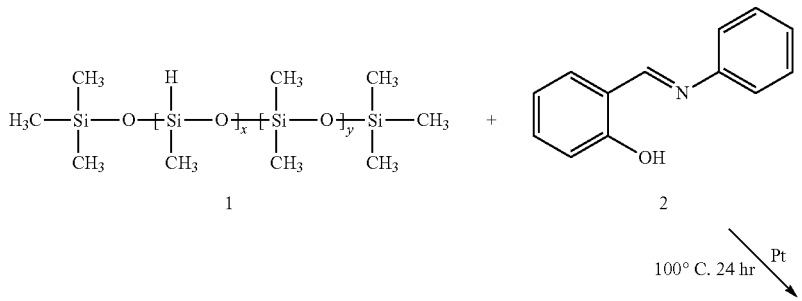

Formula 1

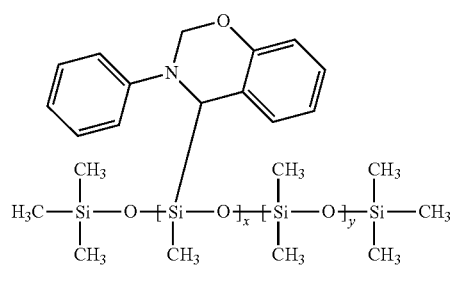

5

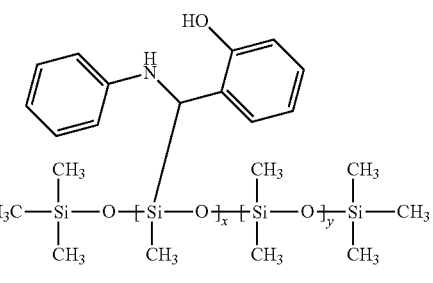

3 paraformaldehyde (4)
100° C. 20 hr

-continued

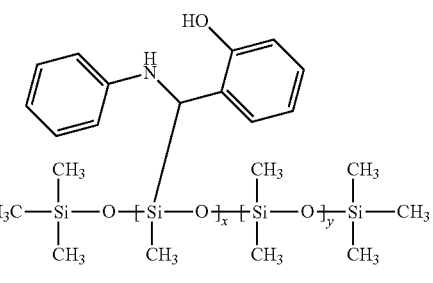

8

Referring to formula 1, in the repetitive units, a polysiloxane molecule chain (1) carrying Si—H groups. The present invention is not restrictive of the quantity and proportion of the Si—H groups. However, considering the cross-linking reaction and the resultant structure of the cross-linking product, in repetitive unit x and repetitive unit y of the polysiloxane molecule chain, the Si—H groups preferably account for 0.015%-100% of all the substitute groups in terms of quantity. 2-hydroxybenzaldehyde or a derivative thereof (2) reacts with the compound (1), and the reaction requires the Si—H group to undergo a polyaddition reaction with the C=O group of the aldehyde group of the compound (2), such that the reactant (2) undergoes an Si—C bonding reaction with a pendant group of the reactant (1) to form a reaction product (3). Then, the reaction product (3) undergoes a ring closing reaction with formaldehyde or a derivative thereof (4), such that a benzoxazine-containing pendant group gets bonded to the polysiloxane molecule chain. The polysiloxane molecule chain with the pendant group carrying a benzoxazine group is known as a product (5). Formula 1 exemplifies the aforesaid production method but is not restrictive of the structures and types of the raw materials for use in the aforesaid production method and the products of the aforesaid production method. The two aforesaid reactions may take place separately. Alternatively, the two aforesaid reactions may take place concurrently without extracting the compound (3). Both the two aforesaid reactions require that the product (5) be produced from the raw material (1). A methyl group bonded to a silicon atom of the polysiloxane can be an aliphatic group or aromatic group which contains two to 12 carbon atoms.

Referring to formula 2, in the repetitive units, a polysiloxane molecule chain (6) has a pendant group carrying a primary amine (—NH2). The present invention is not restrictive of the quantity and proportion of the chemical groups of a pendant group carrying a primary amine (—NH2). However, considering the cross-linking reaction and the resultant structure of the cross-linking product, in repetitive unit x and repetitive unit y of the polysiloxane molecule chain, the chemical groups of a pendant group carrying a primary amine (—NH2) preferably account for 0.015%-100% of all the substitute groups in terms of quantity. A reaction takes place between phenol or a derivative thereof (7), formaldehyde or a derivative thereof (4), and the compound (6), and the reaction produces a benzoxazine according to the prior art, wherein a pendant group carrying the benzoxazine is produced and bonded to the polysiloxane molecule chain, thereby producing a polysiloxane molecule chain (8) of a pendant group carrying the benzoxazine group. Formula 2 exemplifies the aforesaid production method but is not restrictive of the raw materials for use in the aforesaid production method and the structures and types of the products of the aforesaid reaction. A methyl group bonded to the silicon atoms of the polysiloxane can be an aliphatic group or aromatic group which contains two to 12 carbon atoms.

Embodiment 2

Embodiment 3

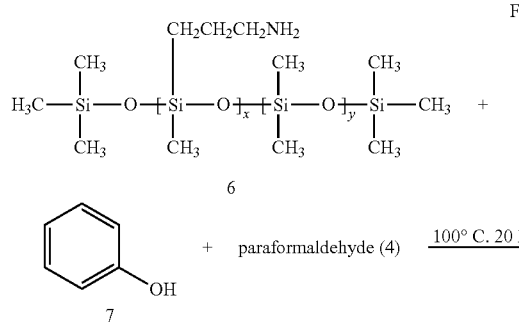

Formula 2

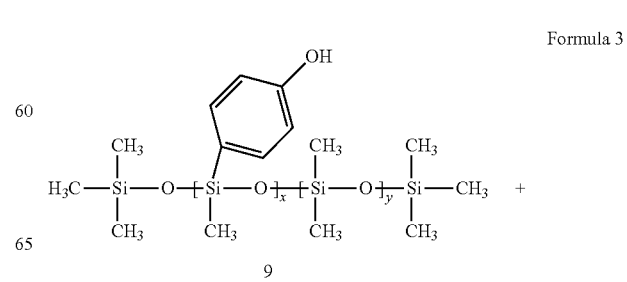

Formula 3

-continued

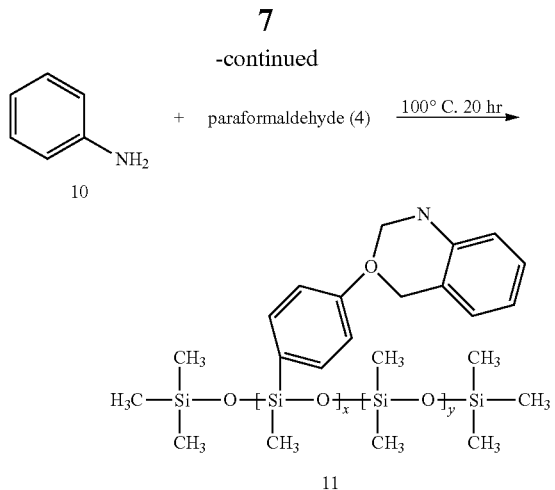

11

Referring to formula 3, in the repetitive units, a polysiloxane molecule chain (9) has a pendant group carrying a phenolic group (—PhOH) or a chemical group derived from it. The present invention is not restrictive of the quantity and proportion of the phenolic group or a chemical group derived therefrom. However, considering the cross-linking reaction and the resultant structure of the cross-linking product, in repetitive unit x and repetitive unit y of the polysiloxane molecule chain, phenolic groups or chemical groups derived therefrom preferably account for 0.015%-100% of all the substitute groups in terms of quantity. An aromatic group carrying a primary amine group, an aliphatic compound, or a derivative thereof (10) reacts with formaldehyde or a derivative thereof (4) and a compound (9). The reaction produces a benzoxazine according to the prior art. A pendant group carrying a benzoxazine is produced and bonded to the polysiloxane molecule chain, so as to produce a polysiloxane molecule chain (11) of a pendant group carrying a benzoxazine group. Formula 3 exemplifies the aforesaid production method but is not restrictive of the raw materials for use in the aforesaid production method and the structures and types of the products of the aforesaid reaction. A methyl group bonded to a silicon atom of the polysiloxane can be an aliphatic group or aromatic group which contains two to 12 carbon atoms.

Embodiment 4

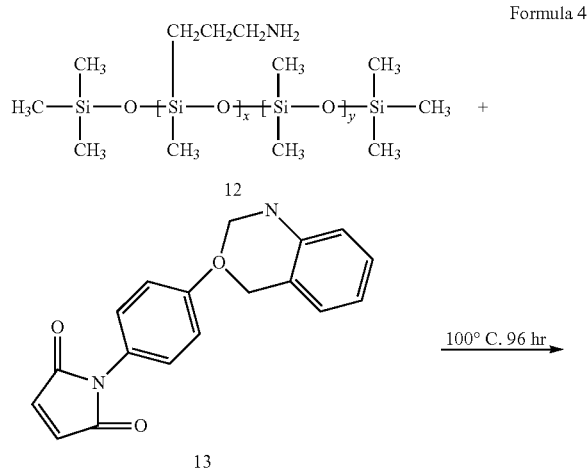

-continued

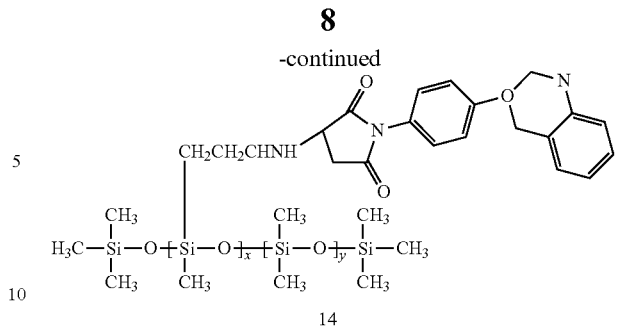

14

Referring to formula 4, in the repetitive units, a polysiloxane molecule chain (12) has a pendant group carrying a reactive group. The reactive group is the aforesaid Si—H, a phenolic group, an amino group, any other reactive group, such as an aldehyde group, a ketone group, an epoxy group, an acid group, an ester group, or a multi-chain unsaturated group, or any other chemical group capable of undergoing a polyaddition or condensation reaction, so as to react with a benzoxazine compound (13) carrying a reactive group. A polyaddition or condensation reaction takes place between a reactive group carried by the compound (13) and a reactive group carried by the compound (12), such that the benzoxazine structure of the compound (12) gets bonded to a pendant group of the polysiloxane molecule chain. The present invention is not restrictive of the quantity and proportion of benzoxazine group-containing substitute groups of a pendant group of a compound (14). However, considering the cross-linking reaction and the resultant structure of the cross-linking product, in repetitive unit x and repetitive unit y of the polysiloxane molecule chain, the benzoxazine structures preferably account for 0.015%-100% all the substitute groups in terms of quantity. The aforesaid reaction is a conventional polymeric reaction whereby a benzoxazine-containing pendant group gets bonded to the polysiloxane molecule chain, so as to produce the polysiloxane molecule chain (14) of a pendant group carrying a benzoxazine group. Formula 4 exemplifies the aforesaid production method but is not restrictive of the raw materials for use in the aforesaid production method and the structures and types of the products of the aforesaid production method. A methyl group of a silicon atom of the polysiloxane can be an aliphatic group or aromatic group which contains two to 12 carbon atoms.

Embodiment 5

The polysiloxane molecule chain comprising a benzoxazine group according to the present invention is capable of undergoing a cross-linking reaction spontaneously in a way as follows: compound 5 obtained in embodiment 1 is heated up at 130 C.° for 1 hour, at 150 C.° for 1 hour, and at 190 C.° for 1 hour, so as to obtain a cross-linked polysiloxane polymer which manifests a high coke production yield as compared to the original polysiloxane raw material.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A crosslinkable polysiloxane molecule, comprising:
a backbone chain comprising silicon-oxygen bonds, and
a pendant group comprising at least a substitute group which contains a benzoxazine group;
wherein the molecular structure is expressed by:

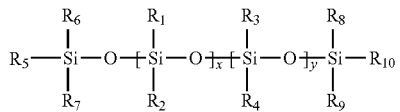

wherein 500≥x+y≥2, substitute groups R1 through R4 are each a substitute group which contains a benzoxazine group or an aliphatic group or aromatic group which contains one to 12 carbon atoms, wherein at least one of the substitute groups R1 through R4 is a substitute group which contains a benzoxazine group, wherein substitute groups R5 through R10 are each an aliphatic group or aromatic group which contains one to 12 carbon atoms.

2. The crosslinkable polysiloxane molecule of claim 1, wherein the crosslinkable polysiloxane molecule is formed by a reaction which occurs between a polysiloxane molecule having pendant phenolic groups, an aromatic or aliphatic primary amine, and formaldehyde.

3. The crosslinkable polysiloxane molecule of claim 1, wherein substituent groups $R_1$ through $R_4$ are each a methyl group or a substituent group carrying a benzoxazine group, wherein at least one of the substituent groups $R_1$ through $R_4$ is a substituent group carrying a benzoxazine group, and substituent groups $R_5$ through $R_{10}$ are each a methyl group.

4. The crosslinkable polysiloxane molecule of claim 1, wherein, in repetitive unit x and repetitive unit y, benzoxazine group-containing substitute groups account for 0.015%-100% of all substitute groups by quantity.

* * * * *